United States Patent
Wong

(10) Patent No.: US 9,855,512 B1
(45) Date of Patent: Jan. 2, 2018

(54) HORIZONTAL CONTROL OF AN INDOOR FLYING TOY

(71) Applicant: DONGGUAN SILVERLIT TOYS, CO., LTD., Dongguan (CN)

(72) Inventor: Kwok Leung Wong, Causeway Bay (HK)

(73) Assignee: DONGGUAN SILVERLIT TOYS, CO., LTD., Dongguan (CN)

( * ) Notice: Subject to any disclaimer, the term of this patent is extended or adjusted under 35 U.S.C. 154(b) by 0 days.

(21) Appl. No.: 15/249,193

(22) Filed: Aug. 26, 2016

(51) Int. Cl.
| | |
|---|---|
| A63H 27/133 | (2006.01) |
| A63H 30/00 | (2006.01) |
| G05D 1/00 | (2006.01) |
| A63H 27/00 | (2006.01) |
| G05D 1/08 | (2006.01) |
| A63H 30/04 | (2006.01) |

(52) U.S. Cl.
CPC ............ *A63H 27/12* (2013.01); *A63H 30/04* (2013.01); *G05D 1/0858* (2013.01)

(58) Field of Classification Search
CPC . A63H 27/12; A63H 3/00; A63H 3/04; A63H 30/00; A63H 30/04; G05D 1/0858; G05D 1/0033; G05D 1/102; G05D 1/0202
USPC ...... 244/17.13, 190; 701/3, 4, 8, 10; 446/36; 340/12.5
See application file for complete search history.

(56) References Cited

U.S. PATENT DOCUMENTS

| | | | | |
|---|---|---|---|---|
| 3,096,046 A * | 7/1963 | Kendall, Jr. | ......... | G05D 1/0033 244/17.13 |
| 3,102,263 A * | 8/1963 | Meyer | ..................... | G01S 7/288 342/107 |
| 4,929,949 A * | 5/1990 | Yamamoto | ............. | A63H 30/00 244/190 |
| 6,434,085 B1 * | 8/2002 | Nedwell | ................. | G01S 15/06 367/100 |
| 6,445,333 B1 * | 9/2002 | Tanaka | .................... | A63H 30/04 244/190 |
| 7,100,866 B2 * | 9/2006 | Rehkemper | ............ | A63H 27/12 244/17.13 |
| 7,248,208 B2 * | 7/2007 | Hager | ................... | G01S 13/882 342/109 |
| 7,440,826 B2 * | 10/2008 | Franceschini | ........ | G05D 1/0646 244/17.13 |
| 8,200,375 B2 * | 6/2012 | Stuckman | .............. | A63H 27/12 244/17.11 |

(Continued)

FOREIGN PATENT DOCUMENTS

WO    WO 2009/076194 A1    6/2009

*Primary Examiner* — Alexander Niconovich
(74) *Attorney, Agent, or Firm* — Jeffrey Yee; Greenberg Traurig, LLP

(57) ABSTRACT

Horizontal control of a toy flying vehicle intended for indoor hovering flight comprises providing the vehicle having a rotor and a separate remote controller for use by a player of the toy. The vehicle is airborne relative to the controller. A signal is sent from a transmitter with the toy to the controller. A variation in intensity of the received signal from the toy being effected in a horizontal plane of the controller. The controller is programmed to transmit a responsive signal to the toy according to the variation of intensity of signal received and thereby to cause the toy with the transmitter in the toy to move horizontally and to thereby retain the received signal in the horizontal direction of the controller at a first predetermined level.

22 Claims, 24 Drawing Sheets

(56) References Cited

U.S. PATENT DOCUMENTS

| | | | | |
|---|---|---|---|---|
| 8,287,326 | B2* | 10/2012 | Huang | A63H 30/04 |
| | | | | 446/31 |
| 8,577,520 | B1* | 11/2013 | Wong | A63H 27/12 |
| | | | | 244/17.13 |
| 8,639,400 | B1* | 1/2014 | Wong | A63H 30/04 |
| | | | | 244/17.13 |
| 2009/0069956 | A1* | 3/2009 | Taya | A63H 27/02 |
| | | | | 701/2 |
| 2010/0161155 | A1* | 6/2010 | Simeray | A63H 27/12 |
| | | | | 701/3 |
| 2010/0210169 | A1* | 8/2010 | Rohr | A63H 30/04 |
| | | | | 446/36 |
| 2012/0029738 | A1* | 2/2012 | Brunetti | G08G 5/0078 |
| | | | | 701/11 |
| 2012/0173053 | A1* | 7/2012 | Ohtomo | G01C 11/04 |
| | | | | 701/4 |
| 2016/0180701 | A1* | 6/2016 | Golliher | G06F 3/017 |
| | | | | 340/12.5 |

* cited by examiner

HORIZONTAL CONTROL OF AN INDOOR FLYING TOY

RELATED PATENT

This application is related to U.S. Pat. No. 8,577,520 (Wong) Altitude Control of an Indoor Flying Toy, issued Nov. 5, 2013. The contents thereof are incorporated by reference here in its entirety.

BACKGROUND

This disclosure relates to a flying vehicle and more specifically to a hovering vehicle that includes a control system to automatically control the horizontal location of the vehicle relative to a surface or another object.

SUMMARY

In present disclosure, a control method is used to direct horizontal control of an indoor vertical flying toy such as helicopter or multi-rotor copter. With this horizontal control function, it is easy to have fight control as the user moves the controller relative of the flying toy.

A control method is used to control and/or maintain the orientation and/or distance between an indoor flying toy such as flying toy or multi-rotor copter and a remote controller. With this control method, it is easy to implement a follow-me function so that the flying toy can move towards the remote controller and hence player.

This control method is selectively basically related to the distance and direction measurement with infrared (IR) technology.

Many advantages and features of the disclosure will become readily apparent from the following detailed description of the disclosure and the embodiments thereof, and from the accompanying drawings.

DRAWINGS

The above-mentioned features and objects of the present disclosure will become more apparent with reference to the following description taken in conjunction with the accompanying drawings wherein like reference numerals denote like elements and in which:

FIG. 1 is perspective view of a helicopter and also showing transmitter.

FIG. 2*a* is a perspective view of a co-axial type helicopter.

FIG. 2*b* is a perspective view of a multi-rotor copter.

Figure 5A:
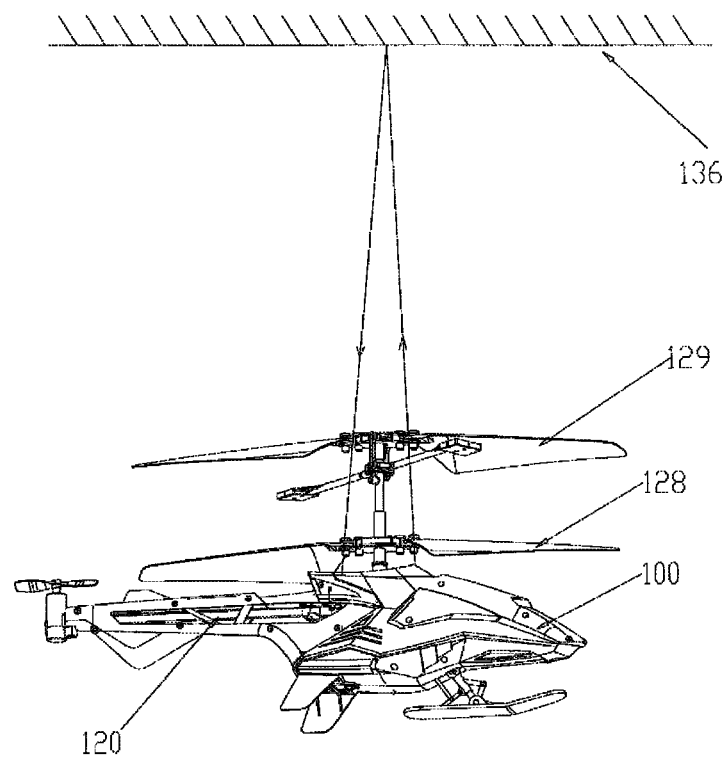

FIG. 5*a* is a perspective view of the present disclosure showing the helicopter having ceiling altitude hold control.

Figure 5B:
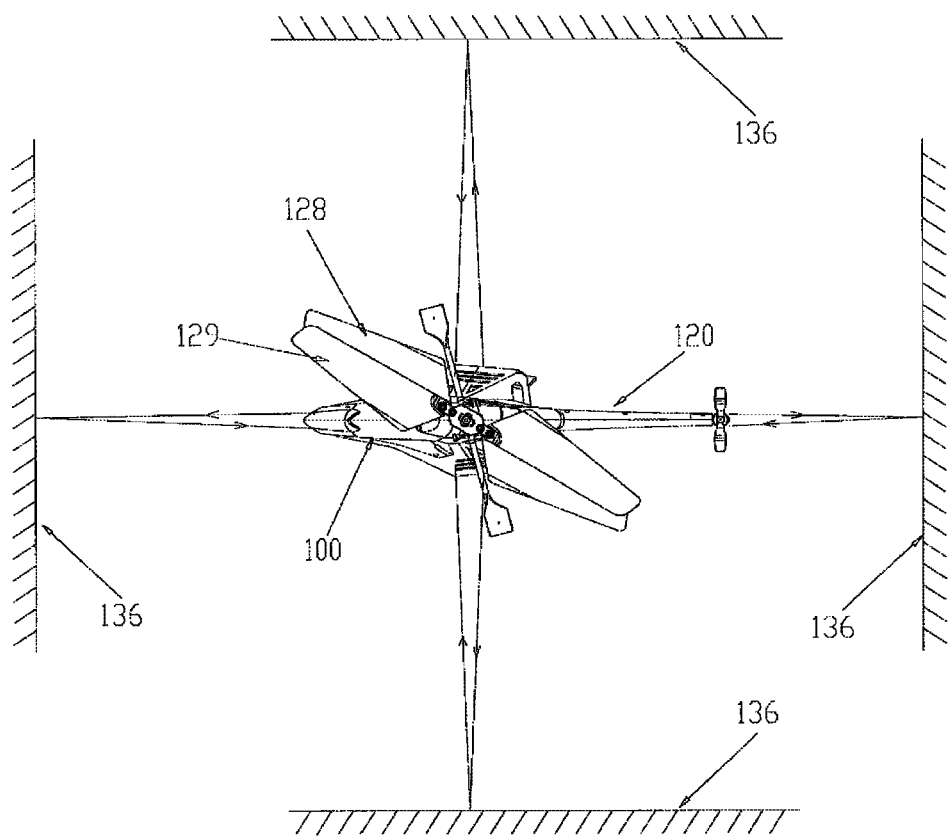

FIG. 5*b* is a perspective view of the present disclosure showing the helicopter having obstacle avoidance control.

Figure 6A:
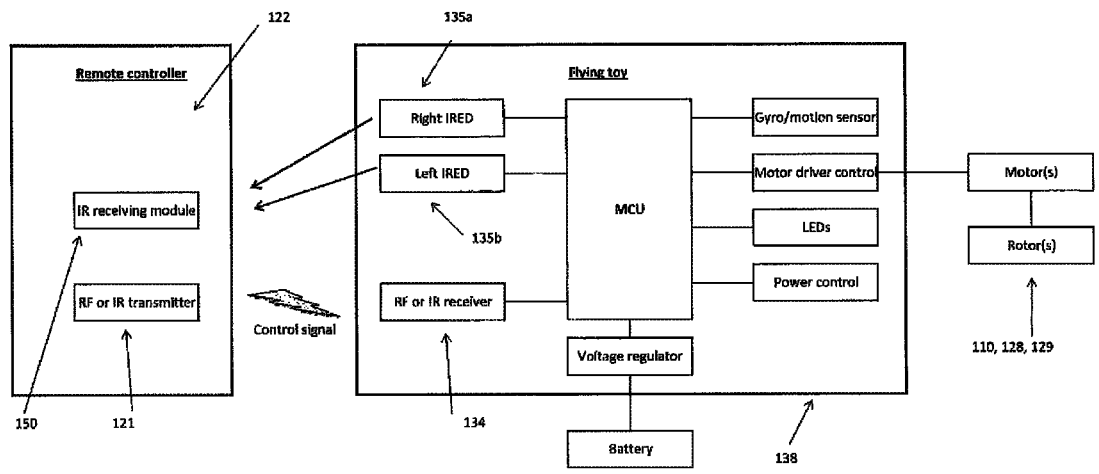

FIG. 6*a* is the block diagram of the electronic components

Figure 6B:
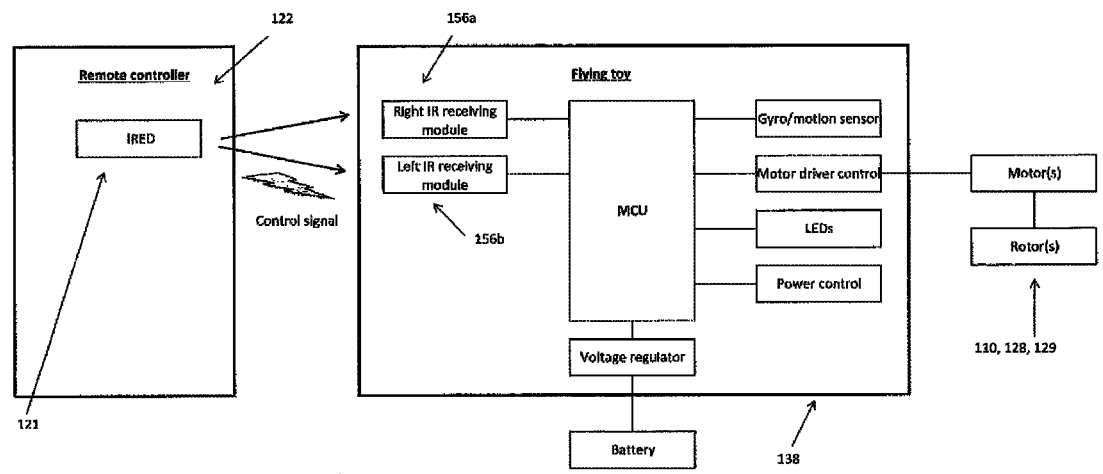

FIG. 6*b* is the block diagram of the electronic components in alternative design.

Figure 6C:
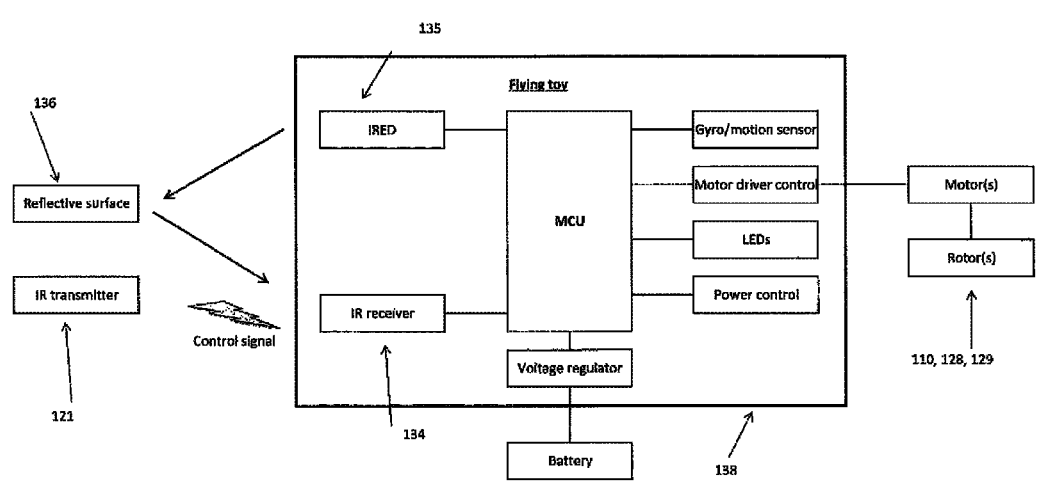
Figure 7A:
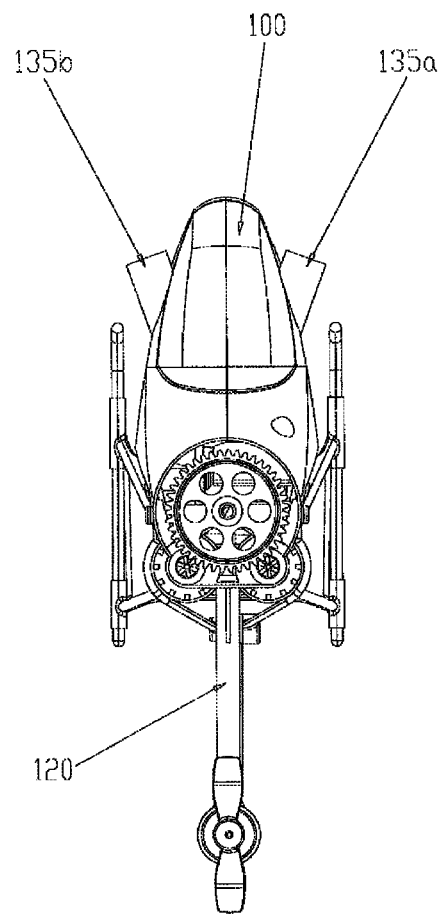

FIG. 6*c* is the block diagram of the electronic components in hovering control FIG. 7*a* is a top plan view of a helicopter.

Figure 7B:
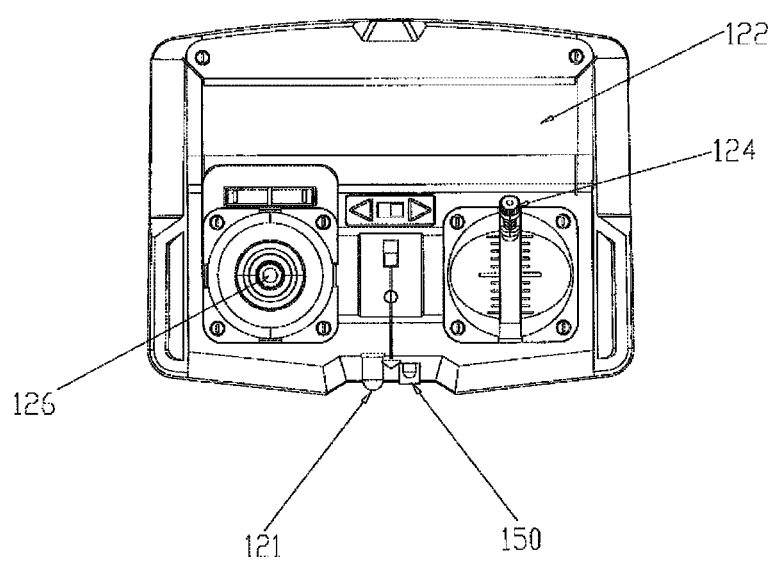

FIG. 7*b* is a top plan view of a controller transmitter.

Figure 7C:
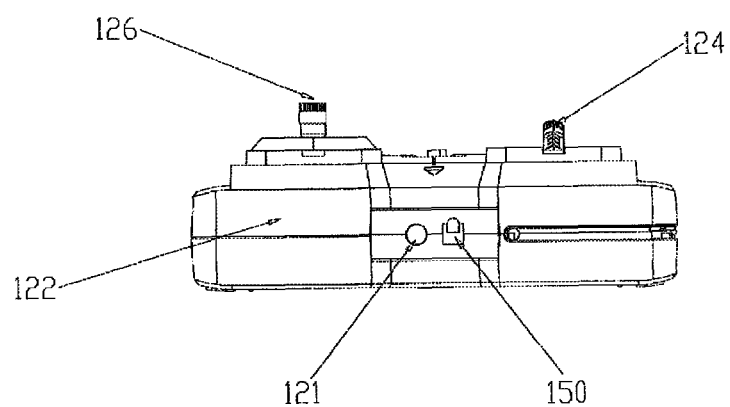

FIG. 7*c* is a front view of a controller transmitter.

Figure 8:
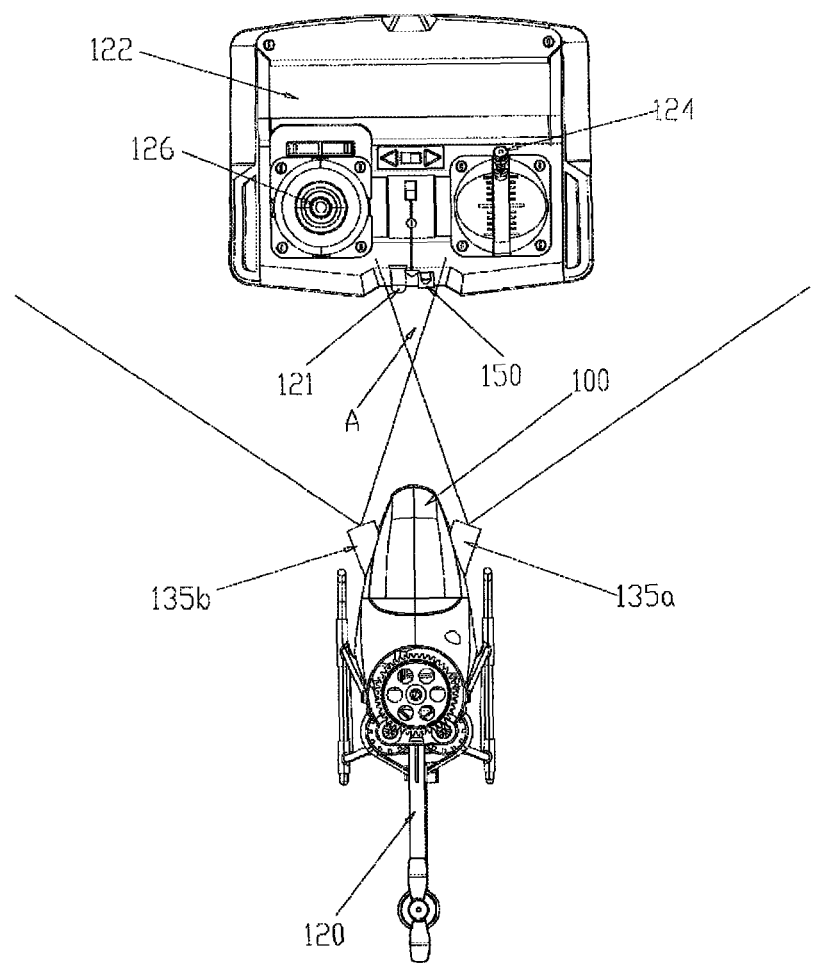

FIG. 8 is a top plan view of a helicopter and a plan view of a controller transmitter in a first horizontal relationship.

Figure 9:
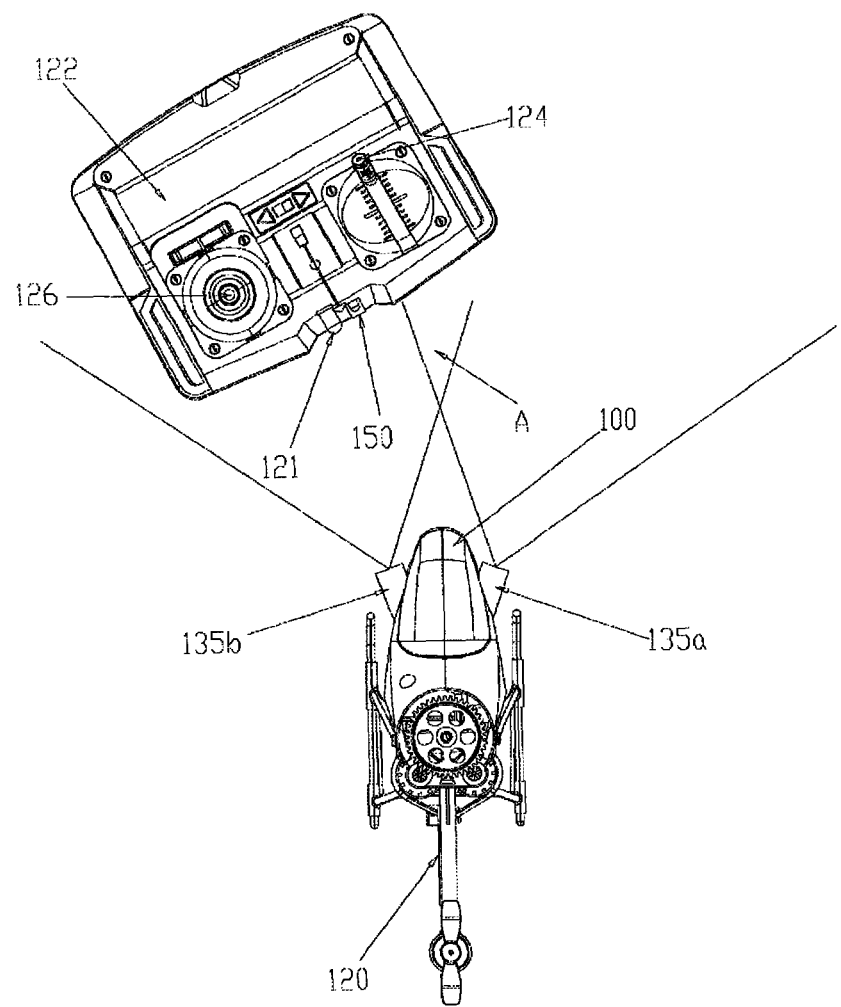

FIG. 9 is a top plan view of a helicopter and a plan view of a controller transmitter in a second horizontal relationship.

Figure 10:
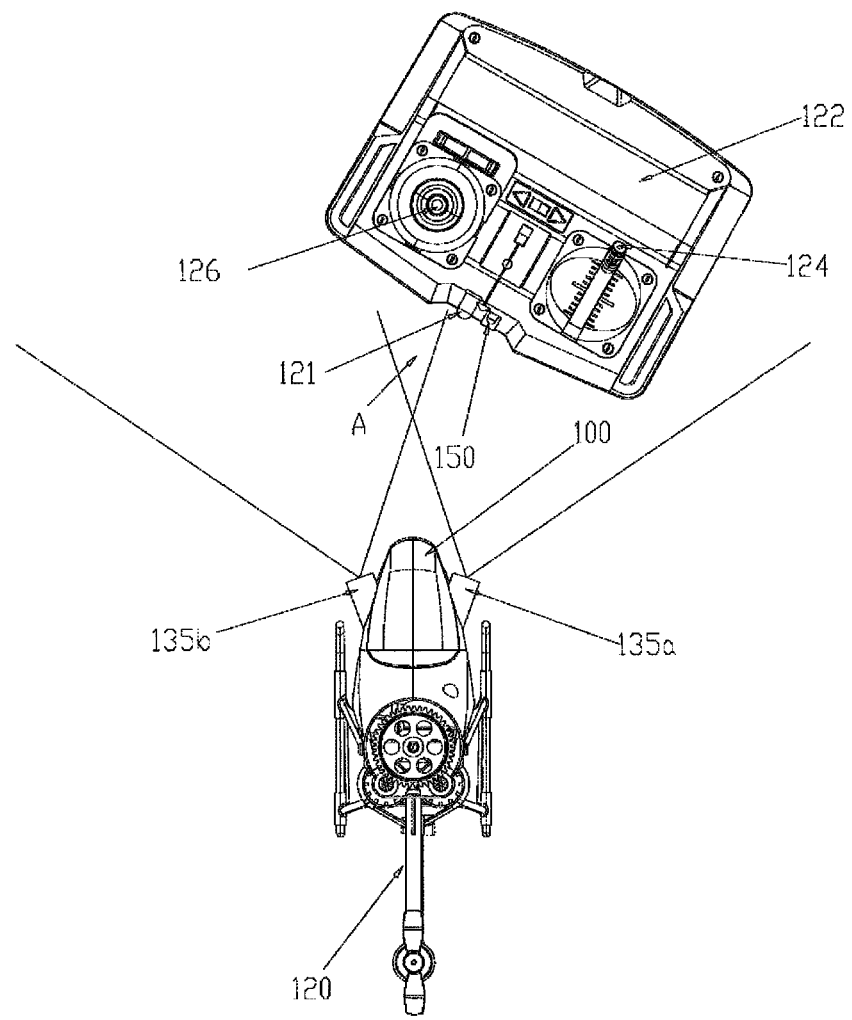

FIG. 10 is a top plan view of a helicopter and a plan view of a controller transmitter in a third horizontal relationship.

Figure 11:
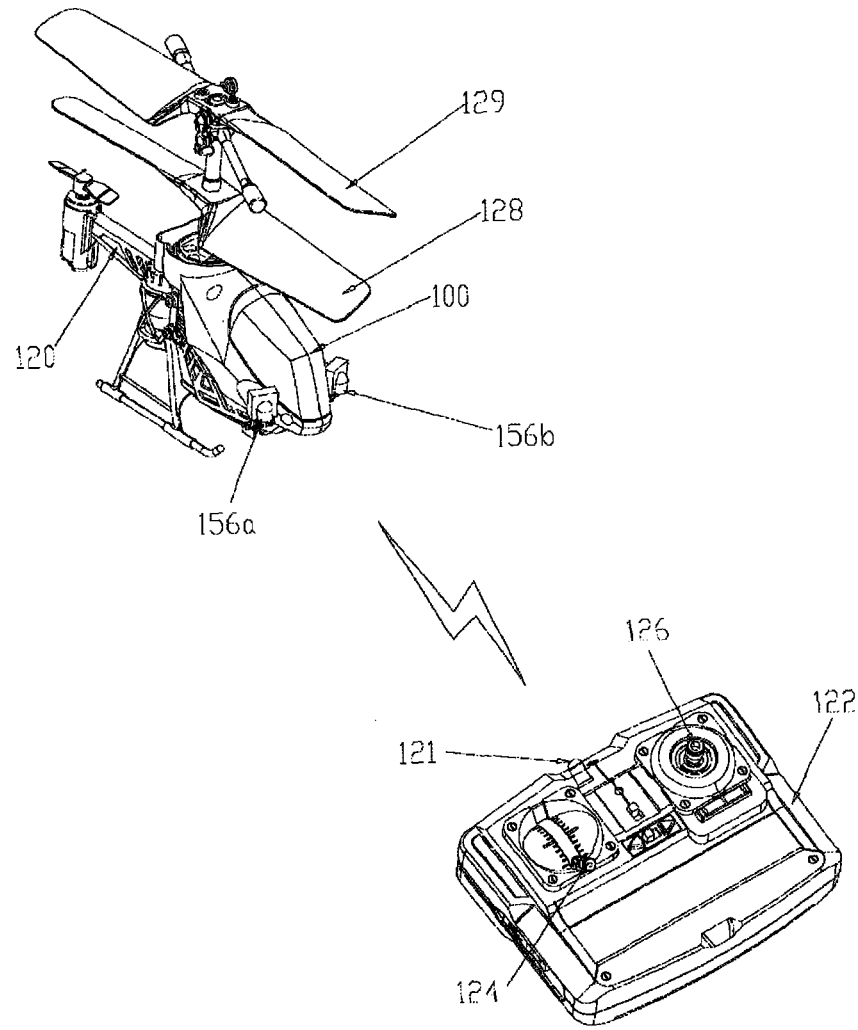

FIG. 11 is a perspective view of an alternative controller transmitter and helicopter.

Figure 12:
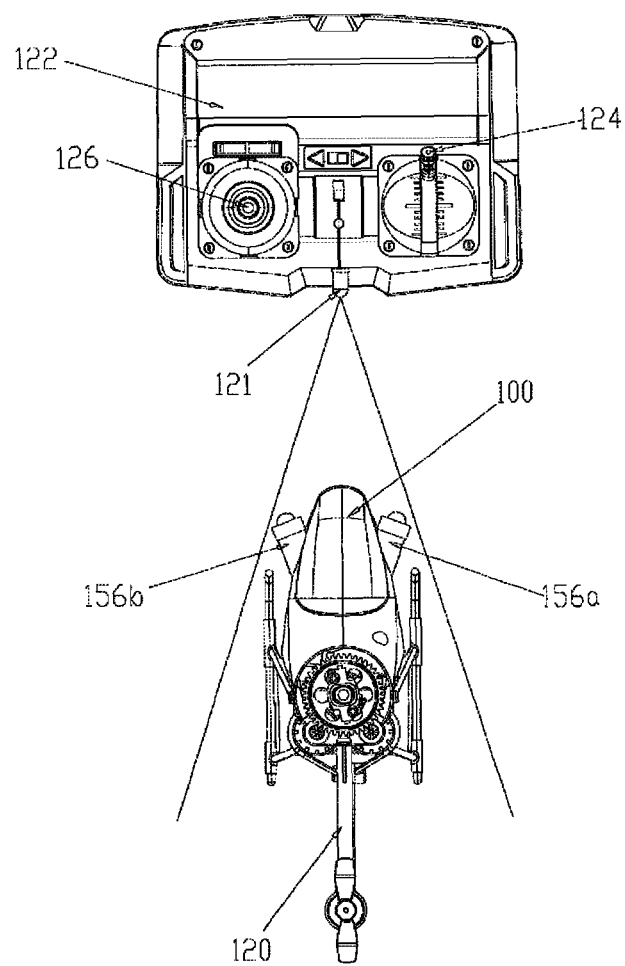

FIG. 12 is a top plan view of a helicopter and a plan view of an alternative controller transmitter in a first horizontal relationship.

Figure 13:
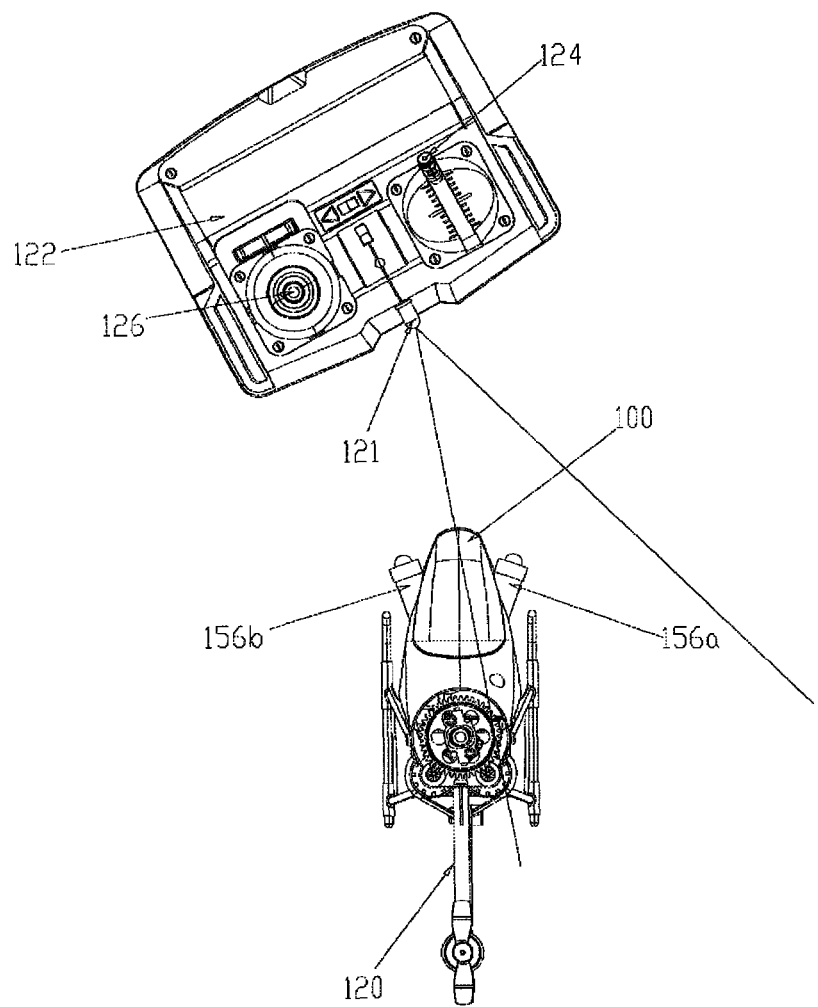

FIG. 13 is a top plan view of a helicopter and a plan view of an alternative controller transmitter in a second horizontal relationship.

Figure 14:
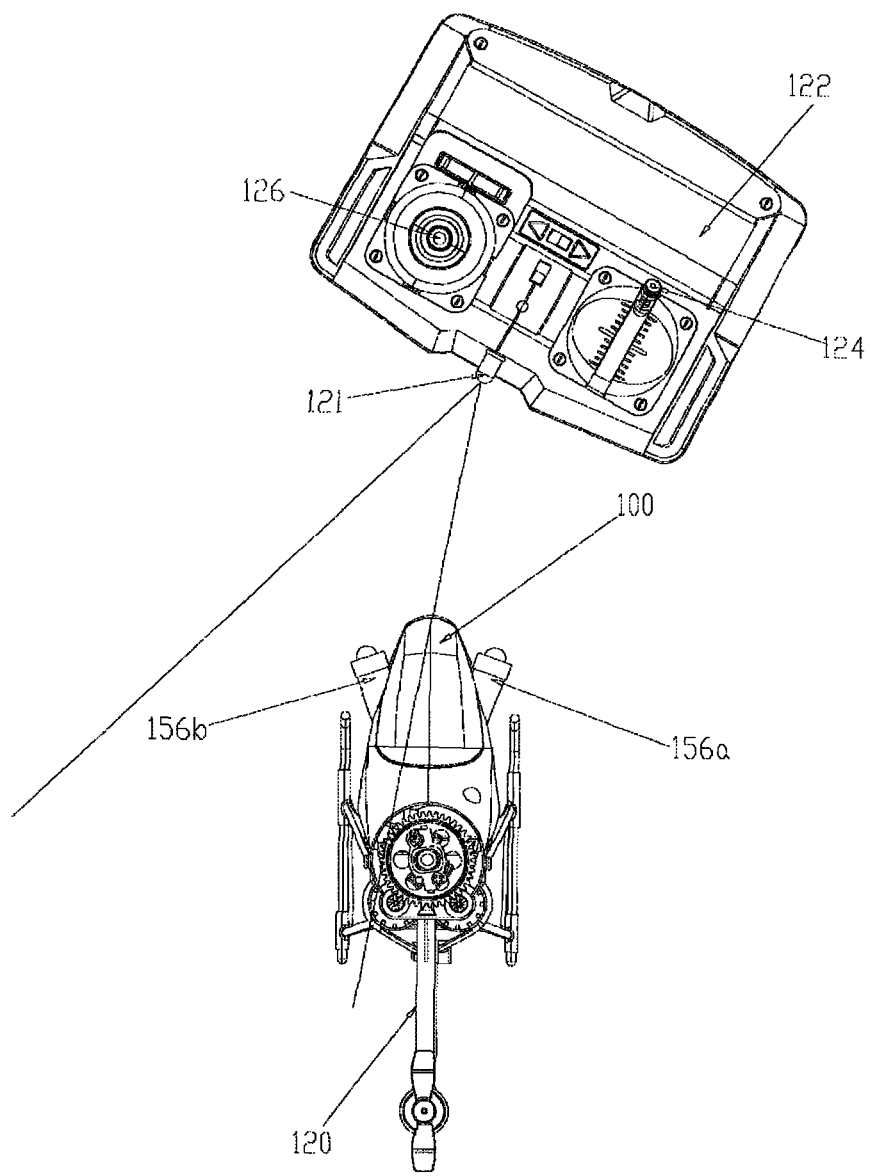

FIG. 14 is a top plan view of a helicopter and a plan view of an alternative controller transmitter in a third horizontal relationship.

Figure 15A:
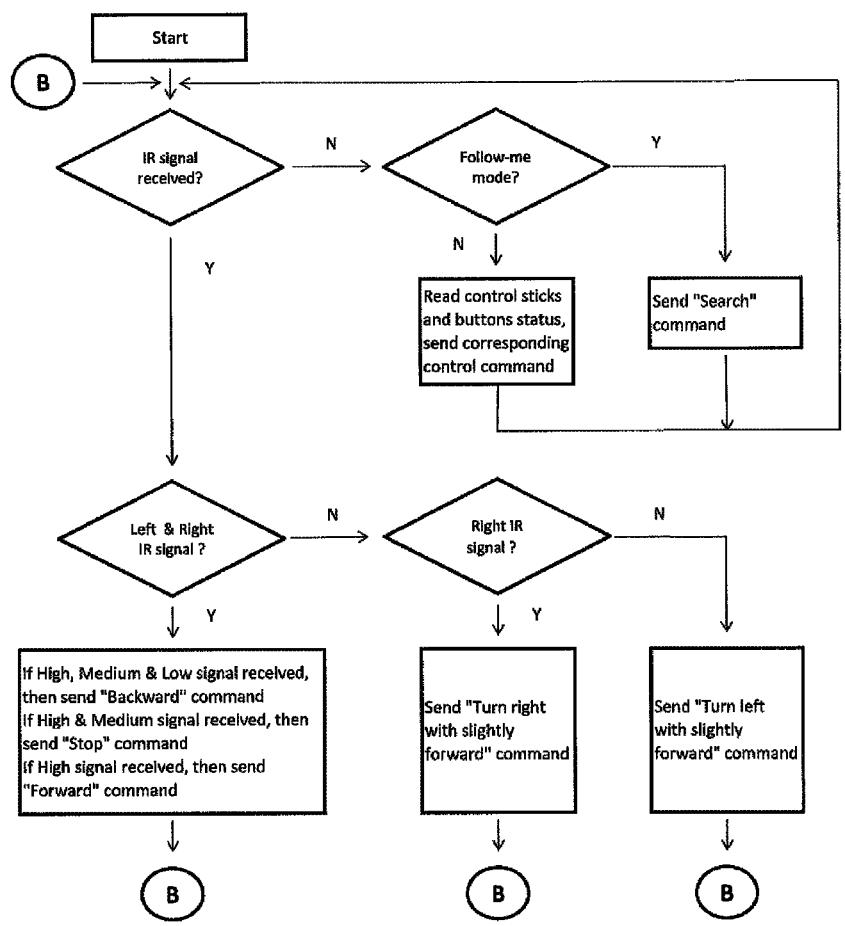

FIG. 15*a* is a flow chart of controller transmitter

Figure 15B:
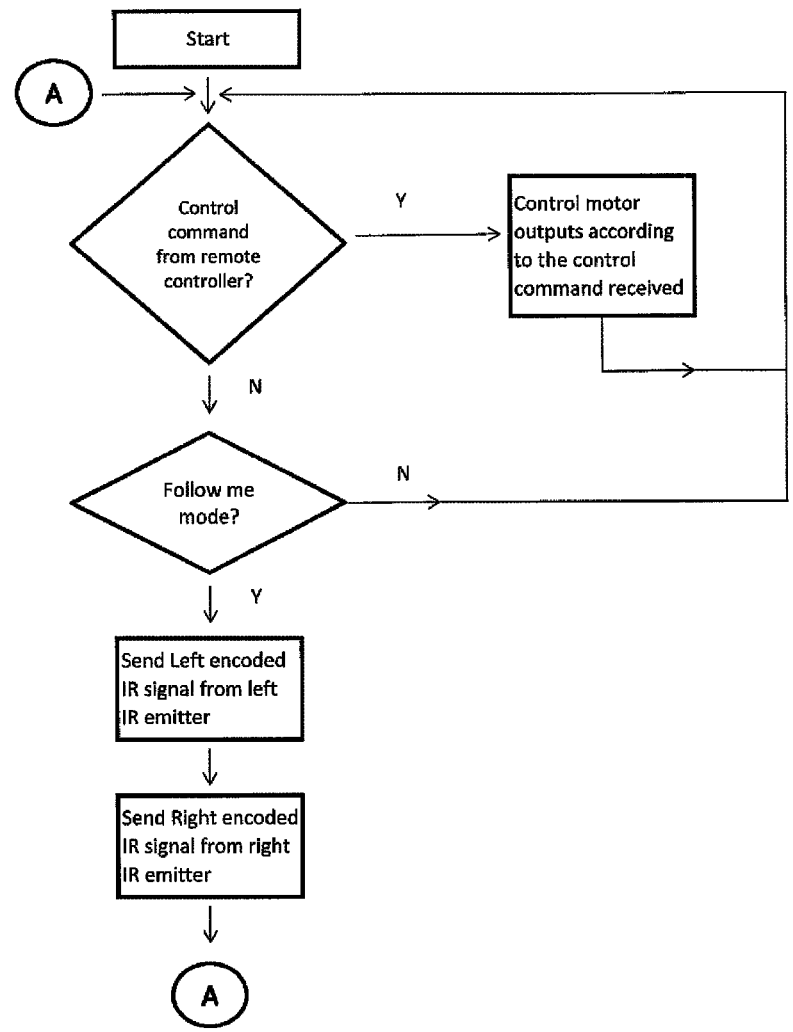

FIG. 15*b* is a flow chart of helicopter

Figure 15C:
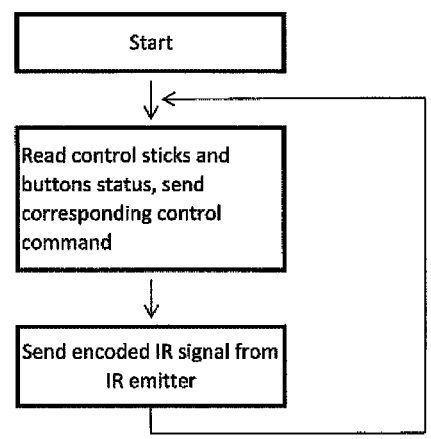

FIG. 15*c* is a flow chart of alternative controller transmitter

Figure 15D:
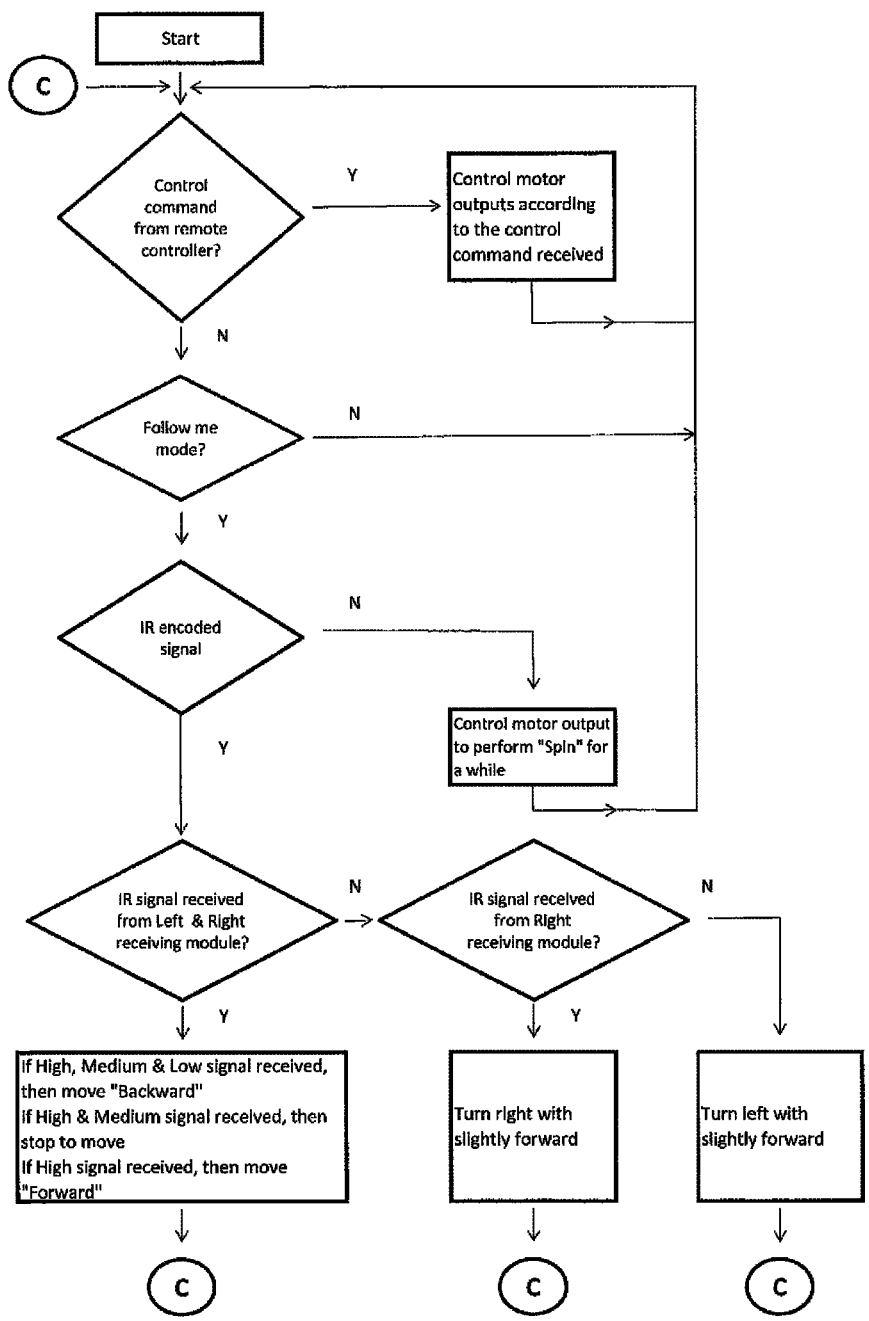

FIG. 15*d* is a flow chart of alternative helicopter

Figure 16:
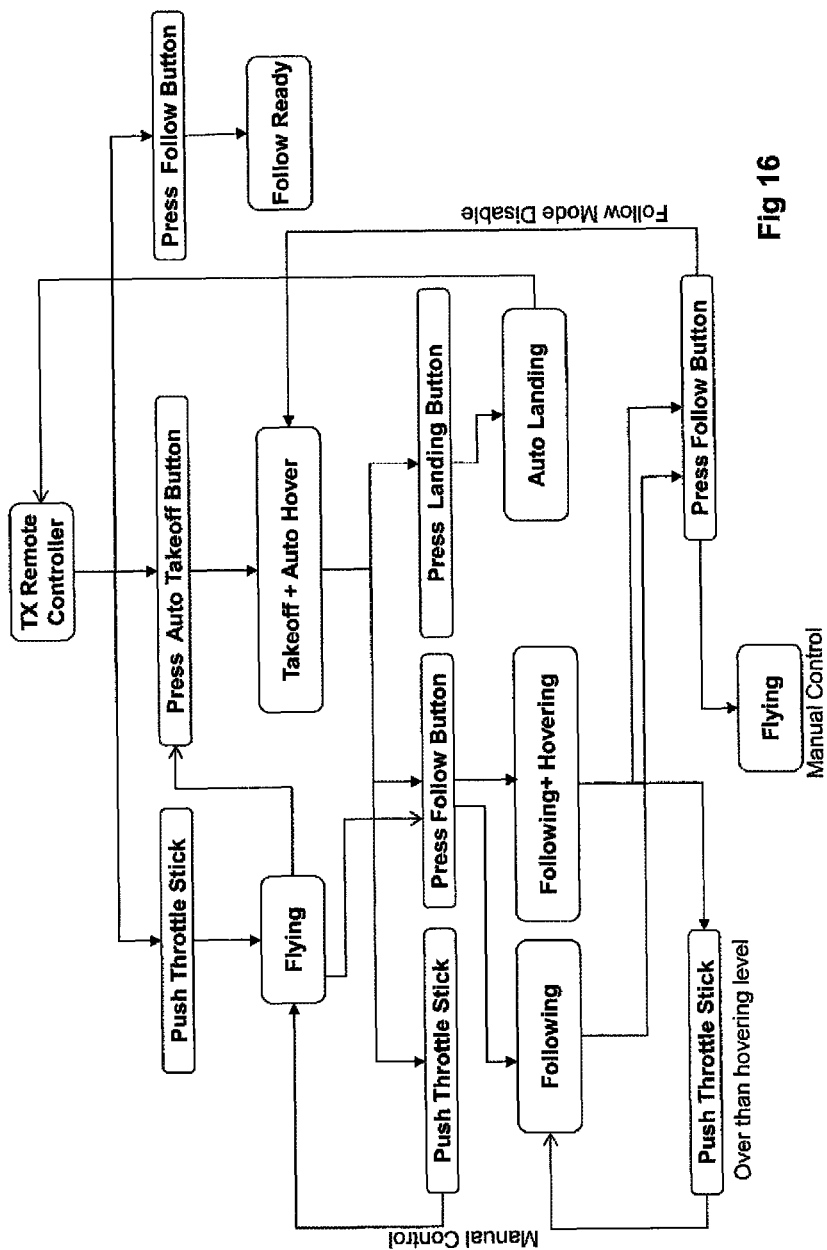

FIG. 16 is a flow chart of horizontal and hover control methods.

DETAILED DESCRIPTION

The disclosure is capable of being implemented in embodiments in many different forms. There are shown in the drawings and will be described herein, in detail, some of the embodiments of the present disclosure. The present disclosure is to be considered an exemplification of the principles of the disclosure and is not intended to limit the spirit or scope of the disclosure and/or the embodiments illustrated.

The disclosure is directed to a method of controlling a flying toy such as helicopter, the system for affecting this control and the toy which is operable in this manner.

There is a method of remote controlling a horizontal direction of a toy flying vehicle intended for indoor operation, the vehicle having a rotor for rotation relative to a fuselage of the vehicle, and a separate remote controller for use by a player of the toy.

The method comprises: (a) positioning the vehicle in an airborne state relative to the controller; (b) sending a signal from a transmitter with the toy to the controller; (c) receiving the signal in the controller and measuring the signal across a horizontal direction of the controller; (d) a variation in intensity of the received signal from the toy being effected in a horizontal plane of the controller; and (e) the controller being programmed to transmit a responsive signal to the toy according to the variation of intensity of signal received. The toy with the transmitter in the toy is caused to move horizontally and to thereby retain the received signal in the horizontal direction of the controller at a first predetermined level.

The toy selectively transmits at least one of an encoded IR signal through a left IR emitter and an encoded IR signal through right IR emitter. The encoded signal contains both horizontal direction and IR power intensity information.

The signal from each IR emitter contains respectively direction and intensity information, selectively, at different discrete levels ranging from high signal, medium signal and low signal. The controller is adapted to receive both encoded signal from left and right emitter; analyze their corresponding intensity information, and send an IR control signal for controlling the toy to move straight forward when the controller receives both left and right high signals.

The controller is also adapted to receive both encoded signal from left and right emitter; analyze their corresponding intensity information, and send an IR control signal for controlling the toy to stop when the controller receives both left and right, high and medium signals.

Further the controller is adapted to receive both encoded signal from left and right emitter; analyze their corresponding intensity information, and send an IR control signal for controlling the toy to move backward when the controller receives both left and right, high, medium and low signals.

Additionally, the controller is adapted to receive both encoded signal from left and right emitter; analyze their corresponding intensity information, and send an IR control signal for controlling the toy whereby if the controller receives left encode signal only, the controller sends a "Left" command to the toy whereby the toy is enabled to turn left and forward for a defined period of time.

The controller is also adapted to receive both encoded signal from left and right emitter; analyze their corresponding intensity information, and send an IR control signal for controlling the toy whereby if the controller receives right encode signal only, the controller sends a "Right" command to the toy so that the toy is enabled to turn right and forward for a defined period of time.

Further the controller is adapted to receive both encoded signal from left and right emitter; analyze their corresponding intensity information, and send an IR control signal for controlling the toy to whereby if the controller does not receive any encoded signal from toy, the controller sends a command to the toy thereby the toy to spin for a defined time about a vertical axis.

As such the toy transmits an encoded IR signal through a left IR emitter and an encoded IR signal through right IR emitter, and wherein the encoded signal contains both horizontal direction and IR power intensity information. The signal from each IR emitter contains respectively direction and intensity information at different discrete levels. The controller is adapted to receive both encoded signal from left and right emitter; analyze their corresponding intensity information, and send a) an IR control signal for controlling the toy to move straight forward when the controller receives selectively both left and right single level equal signals, and/or
b) a signal for controlling the toy to stop when the controller receives selectively both left dual level and right, dual level signals, and/or
c) a signal for controlling the toy to move backward when the controller receives selectively both left tri-level and right, tri level signals.

In other situations, there can be different combinations of different kinds and numbers of respective selected signals (Left, Right and Center) to affect the steering and direction of the flying toy. The vehicle includes a longitudinal axis extending from a rear trailing position of the toy when flying to a leading forward position of the toy when flying. The controller is horizontally movable such that as the controller moves in a horizontal plane, and the horizontal distance between the controller and the toy is regulated and the position of the toy in a horizontal location is established. The method includes moving the controller in a horizontal plane. The transmitter can include a left IR emitter directing the signal to the left and forwardly of the flying toy, and a right IR emitter directing the signal to the right and forwardly of the flying toy. Both left and right emitters with the toy transmit respective signals in a direction forwardly of the flying vehicle and sideways of the vehicle. The forward direction extends horizontally on both sides across the longitudinal axis of the toy, and the signal is received by the controller.

There is a flying toy having plurality of rotors, at least 2 infrared emitting diodes (IRED) 135a, 135b,a receiving module 134, Microcontroller and PCBA 138. This receiving module is used to receive the control command signal from remote controller. The communication link can be for instance IR, RF, Wi-Fi or Bluetooth technology.

The remote controller 122 comprises one IR receiving module, one transmitter, microcontroller and PCBA. As in flying toy, the communication link of this transmitter can be IR, RF, WiFi or Bluetooth technology.

In normal operation, player uses one stick in remote controller to control the throttle and another stick to control the yaw and pitch movement of the flying toy.

In a follow-me mode, the flying toy can follow the direction and try to keep the distance apart between remote controller and flying toy. While the yaw and pitch movement is controlled by flying toy automatically.

If the remote controller is moved forward, backward, left and right, the flying toy will perform the same forward, backward, left and right movement respectively. If the distance between them exceeds the upper and lower limit, the flying toy will adjust itself so as to keep the distance within the limits.

The follow-me control method may comprise:

A flying toy sends out an encoded IR signal through left IR emitter 135b and then right IR emitter 135a or vice versa.

This encoded signal contains both the direction (left & right) and IR power intensity information. For example, signal from left IR emitter 135b contains left direction and intensity information, says, Left High, Left Medium and Left Low while signal from right IR emitter 135a contains right direction and intensity information, says Right High, Right Medium and Right Low.

In overlap region A of FIG. 8, the remote controller can receive both encoded signal from left and right emitter. It will further analyze their corresponding intensity information and send a control command back to flying toy for controlling flying toy to a. move straight forward when the remote controller received Left and Right High signal, or
b. stop when the remote controller received Left and Right, High and Medium signal, or
c. move backward when the remote controller received Left and Right, High, Medium and Low signal.
d. If the remote controller receives left encoded signal only, it will send a "Left" command to flying toy so that the flying toy will turn left with slightly forward for a short period of time.
e. Similarly, if the remote controller receives right encoded signal only, it will send a "Right" command to flying toy so that the flying toy will turn right with slightly forward for a short period of time.

If the remote controller doesn't receive any encoded signal from flying toy, it will send a "Search" command to flying toy so that the flying toy will spin for a very short time.

In alternative design FIG. 11, the remote controller 122 comprises, at least one IRED, microcontroller and PCBA. There is a flying toy having plurality of rotors, at least 2 IR receiving module on left 156b and right 156a of canopy respectively, microcontroller and PCBA 138. This receiving module is used to receive the control command signal as well as encoded signal from remote controller. In fact, the communication link of control command can be for instance IR, RF, WiFi or Bluetooth technology.

In this alternative design, the follow-me control method may comprise:

a remote controller sends out an encoded IR signal through IR emitter 121.

This encoded signal contains IR power intensity information, says, High, Medium and Low.

When the remote controller is pointed towards front of the flying toy so that both the Left IR receiving module 156b and Right IR receiving module 156a of flying toy can receive the encoded signal, it will further analyze their corresponding intensity information and determine itself to
   a. move straight forward when the received signal contains High intensity information, or
   b. stop when the received signal contains High and Medium intensity information, or
   c. move backward when the received signal contains High, Medium and Low intensity information.
   d. If the flying toy receives encoded signal from Left IR receiving module 156b only, it will turn left with slightly forward for a short period of time.
   e. Similarly, if the flying toy receives encoded signal from Right IR receiving module 156a only, it will turn right with slightly forward for a short period of time.
   f. If the flying toy doesn't receive any encoded signal, it will spin along vertical axis for a short time.

Additionally, a player of the toy can us the controller transmitter to provide a selected altitude level for the vehicle. A position control signal is transmitted from the vehicle towards a surface. A receiver in the vehicle is provided for the signal reflected from the surface. A level of the reflected signal by the receiver is determined, and a change of the reflected signal being an indicator of a change of altitude of the vehicle relative to the selected altitude level. The rotor action is adjusted in response to a change of the altitude level thereby to retain the selected altitude level.

The selected level can be a range between an upper and a lower level. Alternatively, the level is a substantially constant altitude.

Adjusting the rotor action is to a lower the speed to lower the vehicle to the selected altitude level or to increase the speed to raise the vehicle to the selected altitude level.

There is a receiver in the vehicle for communication with the remote controller, the remote controller being capable of adjusting and controlling speed and direction of the vehicle.

The position control signal is directed upwardly thereby to retain the altitude relative to surface located above the vehicle. The surface from which the signal is reflected is passive indoor surface without a signal generator feature apart from the reflection of the position control signal. Thus there is no active emitter on the surface, and signal bounces off a wall or ceiling or floor which is the normal structure of an indoor environment. Thus use of the toy does not require anything other than the flying toy itself and the remote controller for the player.

The position control signal is directed downwardly thereby to retain the altitude relative to surface located below the vehicle.

Also there is a position control signal directed transversely relative to the vehicle thereby to reflective from a transversely located surface relative to the vehicle thereby to retain the distance of the vehicle relative to the transversely located surface.

There can be multiple position control signal directed transversely in multiple respective directions relative to the vehicle thereby to reflective from multiple transversely located surfaces relative to the vehicle. This permits the vehicle to retain its distance relative to the multiple transversely located surfaces, and thereby maintain the vehicle at a selected distance relative to the transverse surfaces.

The multiple position control signals are directed relatively transversely, forwardly and sideways of the vehicle.

There can be multiple position control signals directed transversely in multiple respective directions relative to the vehicle thereby to reflective from multiple transversely located surfaces relative to the vehicle. This retains the distance of the vehicle relative to the multiple transversely located surfaces. The multiple position control signals are directed relatively transversely, forwardly and sideways of the vehicle. This maintains the vehicle at a selected distance relative to the transverse surfaces. The signals are directed upwardly and downwardly from the vehicle thereby to maintain the altitude of the vehicle.

A desired selected level of reflected position control signal is defined in at least one receiver in the vehicle. The action of the rotor is dependent on variation from a designated position, as determined by a difference in the received reflected position control signal.

Respective desired selected levels of reflected position control signals can be defined in multiple respective receivers in the vehicle, the respective multiple receivers being directed in respective different directions and there being multiple respective position signals directed in mating respective directions relative the respective receivers. The action of the rotor is dependent on variation from designated positions, as determined by a difference in the received reflected position control signals.

The receiver the vehicle receives throttle and direction control command from the remote controller.

In one form the method of remote controlling an altitude of a toy flying vehicle intended for indoor hovering flight, the vehicle having a rotor for rotation relative to a fuselage of the vehicle, and a separate remote controller for use by a player of the toy comprises providing a selected altitude level for the vehicle. A position control signal from the vehicle towards a surface. A receiver is provided in the vehicle for the signal reflected from the surface. A level of the reflected signal by the receiver, a change of the reflected signal being an indicator of a change of altitude of the vehicle relative to the selected altitude level.

The rotor action is adjusted in response to a change of the altitude level thereby to retain the selected altitude level; wherein the level is a substantially constant altitude.

The vehicle is also in communication with the remote controller, the remote controller being capable of adjusting and controlling speed and direction of the vehicle. The receiver in the vehicle is responsive to signals with the remote controller, and the signals from the remote controller are for changing speed and direction of the hovering toy.

The vehicle receiver communicates with the remote controller, and the remote controller can adjust and control speed and direction of the vehicle.

The receiver in the vehicle is responsive to signals with the remote controller, the signals from the remote controller being for changing speed, and also the direction of the hovering toy.

The position control signal is directed upwardly thereby to retain the altitude relative to surface located above the vehicle, wherein the surface from which the signal is reflected is passive indoor surface without a signal generator feature apart from the reflection of the position control signal. There is an additional position control signal directed relative to the vehicle thereby to reflective from an additional located surface relative to the vehicle thereby to retain the distance of the vehicle relative to the additional located surface.

While the disclosure is susceptible to embodiments in many different forms, there are shown in the drawings and will be described herein, in detail, the preferred embodiments of the present disclosure. It should be understood, however, that the present disclosure is to be considered an exemplification of the principles of the disclosure and is not intended to limit the spirit or scope of the disclosure and/or the embodiments illustrated.

A toy vehicle 100 is for indoor use and is provided with a system to control the height or distance of the vehicle away from a surface or another object. The vehicle 100 includes a rotor 110 to propel the vehicle 100 in a specified direction. There is a fuselage or body 120.

Figure 1:
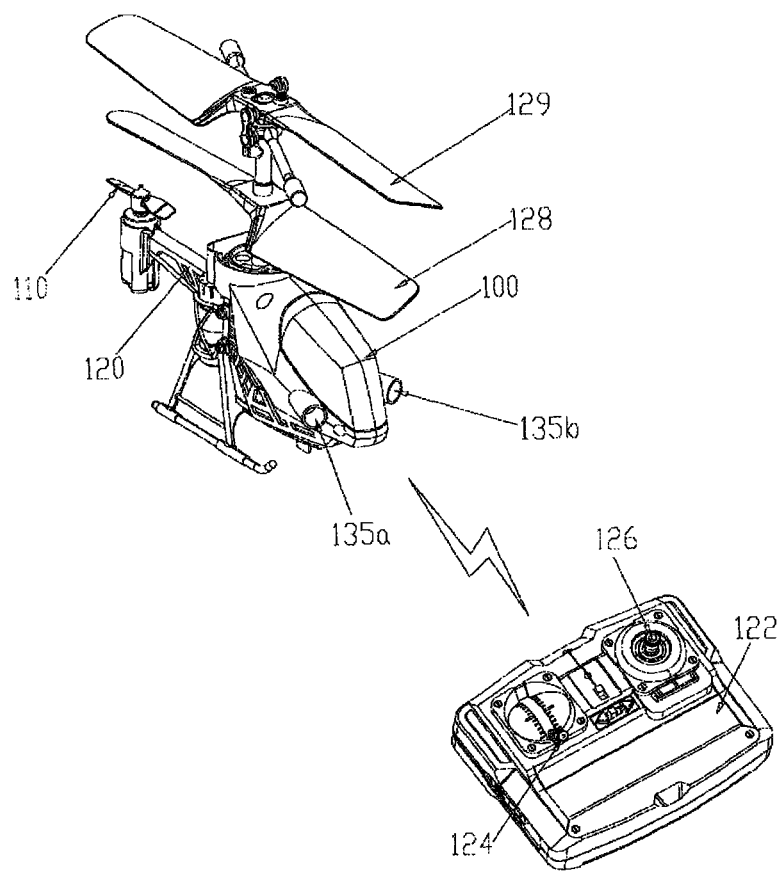
Figure 2A:
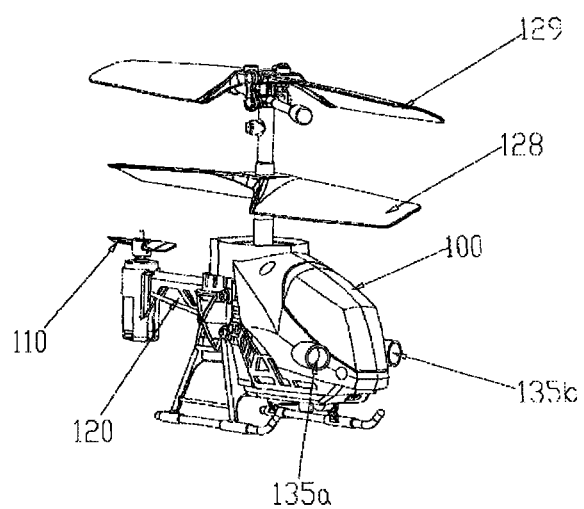
Figure 2B:
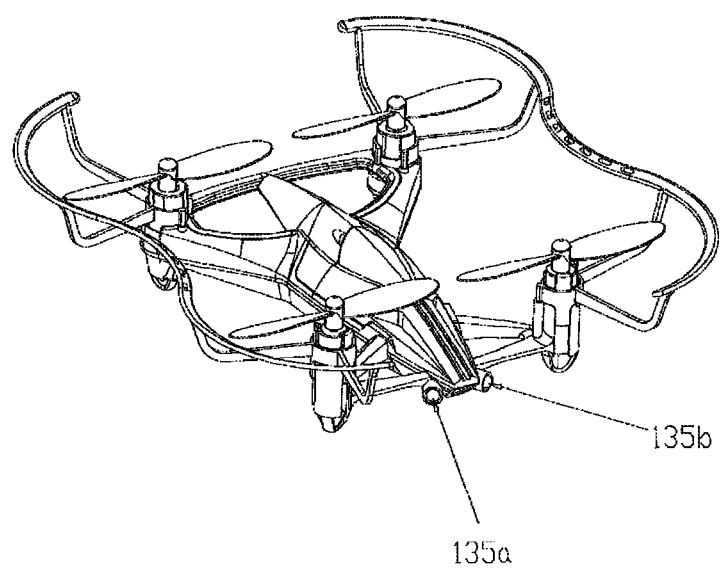
Figure 3:
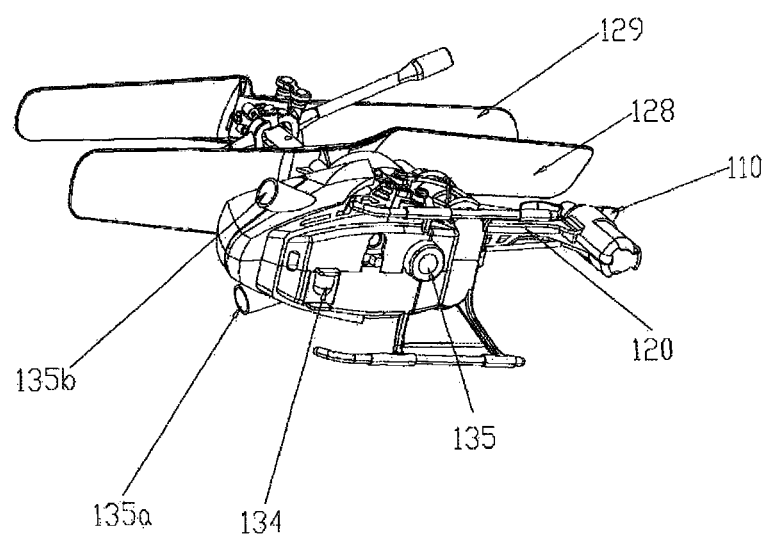
FIG. 3 is a perspective view of a helicopter for showing the IRED and IR receiving module.
Figure 4:
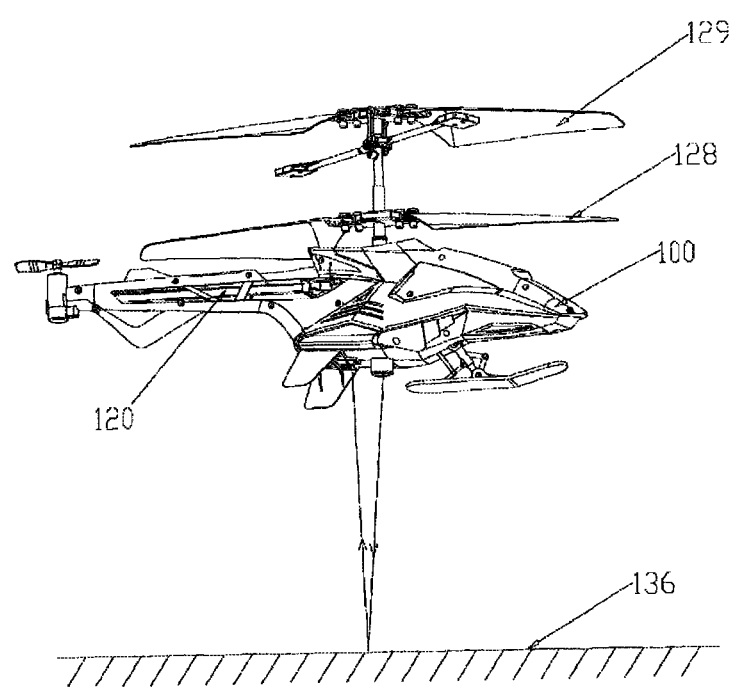
FIG. 4 is a perspective view of the present disclosure showing the helicopter hovering with altitude hold control.

In FIG. 1 there is a single rotor system for hovering toy, namely a helicopter, and there is show a remote controller transmitter 122 with toggles 124 and 126 for controlling speed and direction of the vehicle 100. In FIGS. 2a, 3, 4, 5a and 5b there is show a helicopter with counter rotating rotors 128 and 129. In FIG. 2b there is shown hovering flying toy with four spaced rotors located about the body.

There is a control system and a battery power supply for the hovering toy. The control system includes the remote controller transmitter 122 and a receiver 134 in the body 120 which is in wireless communication with an IR receiving module on a circuit board 138 which is further in communication with and control of the rotor 110. The transmitter 122 and receiver 134 pair is preferably an infra-red pair, however other transmitter/receiver pairs or communication protocols may be used and may be incorporated.

There is IRED cell 135 which generates a signal to a reflective surface 136 which in turn reflects or bounces the signal back to the receiving module 134. This signal, together with any signals from the transmitter 122, is processed by the microprocessor circuit MCU. The MCU in turn is powered by the battery through a voltage regulator. The MCU controls the Gyro sensor, motor driver control, LEDs and the power control of the hovering vehicle. The motor drive control controls one or more motors to control one or more rotors respectively.

The control method of the transmitter is not limited to Infrared. It can be a radio frequency such as 27 MHz, 40 MHz, 49 MHz or 2.4 GHz, or be Bluetooth or WiFi.

By putting the IRED and IR receiving module on top of flying toy and applying present IR distance measurement method, it can be used to perform an altitude hold fight with reference to ceiling of a room rather than ground surface. (FIG. 5a).

Similarly, it can be used to detect the distance between the flying toy and obstacles, objects or surfaces around it. By changing the direction of flight rather than moving upward or down as in present disclosure, it can act as obstacle avoidance control (FIG. 5b)

There can be a flying toy having plurality of rotors, infrared emitting diode (IRED) and IR receiving module. This module can be used to receive the signal from transmitter and the signal from the IRED itself. In physics, the intensity or brightness of light as a function of the distance from the light source follows an inverse square relationship. For a given reflecting ground upper or transverse surface and given sensitivity of IR receiving module, the relationship between light intensity and distance can be obtained.

Because of using light reflection method, the maximum height can be measured is limited to less than about 3 meters.

The IR signal is usually modulated to around 30 to about 40 kHz for transmission while IR receiving module can filter the noise out of these frequency range and demodulate the signal for MCU decoding. The intensity of IR light that an IRED produces is directly proportional to the current. By controlling different levels of voltage supply and hence current to IRED, different light intensity can be obtained.

The apparatus and method have been described in terms of what are presently considered to be the most practical and preferred embodiments, it is to be understood that the disclosure need not be limited to the disclosed embodiments.

It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method of remote controlling a horizontal direction of a toy flying vehicle intended for indoor operation with a horizontally movable separate controller such that as the controller moves in a horizontal plane, the horizontal distance between the controller and the toy is regulated and the position of the toy in a horizontal location is established, the vehicle having a rotor for rotation relative to a fuselage of the vehicle, and a longitudinal axis extending from a rear trailing position of the toy when flying to a leading forward position of the toy when flying, and the separate remote controller being for use by a player of the toy, the method comprising: (a) positioning the vehicle in an airborne state relative to the controller; (b) sending a signal from a transmitter with the toy to the controller; (c) receiving the signal in the controller and measuring the signal across a horizontal direction of the controller; (d) a variation in intensity of the received signal from the toy being effected in a horizontal plane of the controller, moving the controller in a horizontal plane; and (e) the controller being programmed to transmit a responsive signal to the toy according to the variation of intensity of signal received and thereby to cause the toy to move horizontally and to thereby retain the received signal in the horizontal direction of the controller at a first predetermined level, a transmitter with the toy transmitting the signal in a direction forwardly of the flying vehicle and sideways, the forward direction extending horizontally on both sides across the longitudinal axis of the toy, and the signal being received by the controller.

2. A method as claimed in claim 1 wherein the transmitter including a left IR emitter directing the signal to the left and forwardly of the flying toy, and a right IR emitter directing the signal to the right and forwardly of the flying toy and responsively selectively transmits an encoded IR signal through the left IR emitter and an encoded IR signal through the right IR emitter.

3. A method as claimed in claim 2 wherein the encoded signals contain both horizontal direction and IR power intensity information.

4. A method as claimed in claim 2 wherein the signal from each IR emitter contains respectively direction and intensity information, selectively, at different discrete levels ranging from high signal, medium signal and low signal.

5. A method as claimed in claim 4 wherein the controller is adapted to receive both encoded signal from the left and right emitter; analyze their corresponding intensity information, and sends an IR control signal for controlling the toy to move straight forward when the controller receives both left and right high signals.

6. A method as claimed in claim 4 wherein the controller is adapted to receive both encoded signal from the left and right emitter; analyze their corresponding intensity information, and sends an IR control signal for controlling the toy to stop when the controller receives both left and right, high and medium signals.

7. A method as claimed in claim 4 wherein the controller is adapted to receive both encoded signal from the left and right emitter; analyze their corresponding intensity information, and sends an IR control signal for controlling the toy to move backward when the controller receives both left and right, high, medium and low signals.

8. A method as claimed in claim 4 wherein the controller is adapted to receive both encoded signal from the left and right emitter; analyze their corresponding intensity information, and sends an IR control signal for controlling the toy whereby if the controller receives left encode signal only, the controller sends a "Left" command to the toy whereby the toy is enabled to turn left and forward for a defined period of time.

9. A method as claimed in claim 4 wherein the controller is adapted to receive both encoded signal from the left and right emitter; analyze their corresponding intensity information, and sends an IR control signal for controlling the toy whereby if the controller receives right encode signal only, the controller sends a "Right" command to the toy so that the toy is enabled to turn right and forward for a defined period of time.

10. A method as claimed in claim 4 wherein the controller is adapted to receive both encoded signal from the left and right emitter; analyze their corresponding intensity information, and sends an IR control signal for controlling the toy whereby if the controller does not receive any encoded signal from toy, the controller sends a command to the toy thereby the toy to spin for a defined time about a vertical axis.

11. A method as claimed in claim 10 wherein the multiple position control signals are directed relatively transversely, forwardly and sideways of the vehicle.

12. A method as claimed in claim 2 including determining a selected altitude for the toy in a range between an upper and a lower level, and wherein the selected altitude is a substantially constant altitude, and wherein the vehicle includes a receiver for communication with the controller, the controller being capable of adjusting and controlling speed and direction of the vehicle.

13. A method as claimed in claim 1 further including transmitting a position control signal directed transversely relative to the vehicle thereby to reflect from a transversely located surface relative to the vehicle thereby to retain a distance of the vehicle relative to the transversely located surface.

14. A method as claimed in claim 1 including multiple position control signals directed transversely in multiple respective directions relative to the vehicle thereby to reflect from multiple transversely located surfaces relative to the vehicle thereby to determine one or more respective relative distances of the vehicle to the multiple transversely located surfaces, wherein the multiple position control signals are directed relatively transversely, forwardly and sideways of the vehicle, and thereby maintain the vehicle at one or more respective selected distances to the transverse surfaces, and including signals directed upwardly and downwardly from the vehicle thereby to maintain the selected altitude of the vehicle.

15. A method as claimed in claim 1 further including defining a desired selected level of reflected position control signal in at least one receiver in the vehicle, and wherein the action of the rotor is dependent on variation from a designated position, as determined by a difference in the received reflected position control signal.

16. A method as claimed in claim 1 including defining respective desired selected levels of reflected position control signals in multiple respective receivers in the vehicle, the respective multiple receivers being directed in respective different directions and there being multiple respective position signals directed in mating respective directions relative the respective receivers, and wherein the action of the rotor is dependent on at least one variation from at least one designated position, as determined by at least one difference in the received reflected position control signals.

17. A method as claimed in claim 1 wherein the vehicle is configured to limit a maximum height thereby to receive at least one reflected signal.

18. A method of remote controlling a horizontal direction of a toy flying vehicle intended for indoor operation, the vehicle having a rotor for rotation relative to a fuselage of the vehicle, and a separate remote controller for use by a player of the toy, the method comprising: (a) positioning the vehicle in an airborne state relative to the controller; (b) sending a signal between the toy and the controller; (c) receiving the signal and measuring the signal across a horizontal direction; (d) a variation in intensity of the received signal being effected in a horizontal plane; (e) the controller being programmed to transmit a responsive signal to the toy according to the variation of intensity of signal received and thereby to cause the toy with the transmitter in the toy to move horizontally and to thereby retain the received signal in the horizontal direction of the controller at a first predetermined level; wherein an encoded first signal is through a left emitter and an encoded signal is through a right emitter, and wherein the encoded signal contains both horizontal direction and power intensity information, and wherein the signal from each emitter contains respectively direction and intensity information at different discrete levels, the controller being horizontally movable such that as the controller moves in a horizontal plane, the horizontal distance between the controller and the toy is regulated and the position of the toy in a horizontal location is established, including moving the controller in a horizontal plane; and both emitters with the toy transmitting respective signals in a direction forwardly of the flying vehicle and sideways of the vehicle.

19. A method as claimed in claim 18 wherein the controller is adapted to receive both encoded signal from the left and right emitter; analyze their corresponding intensity information, and sends an IR control signal for controlling the toy to move straight forward when the controller receives both left and right high signals.

20. A method as claimed in claim 18 wherein the controller is adapted to receive both encoded signal from the left and right emitter; analyze their corresponding intensity information, and sends an IR control signal for controlling the toy to stop when the controller receives both left and right, high and medium signals.

21. A method as claimed in claim 18 wherein the controller is adapted to receive both encoded signal from the left and right emitter; analyze their corresponding intensity information, and sends an IR control signal for controlling the toy to move backward when the controller receives both left and right, high, medium and low signals.

22. A method of remote controlling a horizontal direction of a toy flying vehicle intended for indoor operation, the vehicle having a rotor for rotation relative to a fuselage of the vehicle, and a separate remote controller for use by a player of the toy, the method comprising: (a) positioning the vehicle in an airborne state relative to the controller; (b) sending a signal between a transmitter with the toy and the controller; (c) receiving the signal in the controller and measuring the signal across a horizontal direction of the controller; (d) a variation in intensity of the received signal from the toy being effected in a horizontal plane of the controller; (e) the controller being programmed to transmit a responsive signal to the toy according to the variation of intensity of signal received and thereby to cause the toy with the transmitter in the toy to move horizontally and to thereby retain the received signal in the horizontal direction of the controller at a first predetermined level; wherein the toy transmits an encoded IR signal through a left IR emitter and an encoded IR signal through right IR emitter, and wherein the encoded signals contain both horizontal direction and IR power intensity information, and wherein the signal from each IR emitter contains respectively direction and intensity information at different discrete levels, wherein the controller is adapted to receive both encoded signals from left and right emitter; analyze their corresponding intensity information, and sends an IR control signal for controlling the toy to move straight forward when the controller receives selectively both left and right single level equal signals, a signal for controlling the toy to stop when the controller receives selectively both left dual level and right, dual level signals, a signal for controlling the toy to move backward when the controller receives selectively both left tri-level and right, tri level signals, the controller being horizontally movable such that as the controller moves in a horizontal plane, the horizontal distance between the controller and the toy is regulated and the position of the toy in a horizontal location is established, including moving the controller in a horizontal plane; and both emitters with the toy transmitting respective signals in a direction forwardly of the flying vehicle and sideways of the vehicle.

* * * * *